United States Patent [19]

Zider

[11] Patent Number: 4,925,132

[45] Date of Patent: May 15, 1990

[54] WIDE-BODY AIRCRAFT HAVING EFFICIENT UTILIZATION OF INTERIOR SPACE AND METHOD THEREFOR

[75] Inventor: Robert B. Zider, Portola Valley, Calif.

[73] Assignee: The Beta Group, Palo Alto, Calif.

[21] Appl. No.: 277,862

[22] Filed: Nov. 30, 1988

[51] Int. Cl.⁵ .............................................. B64C 1/18
[52] U.S. Cl. .................. 244/118.1; 244/119; 244/118.6
[58] Field of Search .................. 244/118.5, 118.6, 119, 244/118.1, 117 R

[56] References Cited

U.S. PATENT DOCUMENTS

| | | | |
|---|---|---|---|
| 4,022,404 | 5/1977 | Greiss | 244/118.5 |
| 4,066,227 | 1/1978 | Buchsel | 244/118.6 |

FOREIGN PATENT DOCUMENTS

| | | | |
|---|---|---|---|
| 3007733 | 9/1981 | Fed. Rep. of Germany | 244/118.5 |
| 1473111 | 2/1967 | France | 244/118.6 |
| 2169256 | 7/1986 | United Kingdom | 244/118.5 |

OTHER PUBLICATIONS

Stone, "Boeing Studies Three Civil C-5A Versions", Aviation Week and Space Tech., Dec. 27, 1965, pp. 46-47.

*Primary Examiner*—Galen Barefoot
*Attorney, Agent, or Firm*—Burns, Doane, Swecker & Mathis

[57] ABSTRACT

There is disclosed an improved wide-body aircraft. The aircraft has a fuselage, a main deck and a lower deck, each deck extending substantially the entire length of the fuselage. Each of the decks is vertically spaced apart such that each of the decks is equally suitable for carrying passengers or cargo. Further, the main deck may be situated so that it is above the center line of the fuselage. There is also disclosed a method of improving the utilization of space in a wide-body aircraft.

21 Claims, 3 Drawing Sheets

SECTION MODULI

WIDE-BODY AIRCRAFT HAVING EFFICIENT UTILIZATION OF INTERIOR SPACE AND METHOD THEREFOR

BACKGROUND OF THE INVENTION

The present invention relates to wide-body aircraft such as the Boeing 747 and the like and, more particularly, relates to the improved utilization of interior space in such aircraft so that the aircraft is able to greatly increase its passenger and/or cargo carrying capacity.

It is well known in the airline industry that airline profitability is directly related to passenger revenues and cargo revenues which are, in turn, a function of passenger seating space and cargo carrying space, respectively. The greater the passenger seating space, the greater are the potential passenger revenues. Similarly, the greater the cargo carrying space, the greater are the potential cargo revenues.

It follows then that a way to increase profitability is to increase passenger seating space and cargo carrying space.

The present invention is based upon the realization that the wide-body aircraft of today are not configured for the best use of the available space within the confines of the aircraft. Since wide-body aircraft (both passenger carrying and cargo carrying) bulk-out rather than weight-out (i.e., the lifting capacity of the aircraft is not the limiting factor), the entire economics of the aircraft revolves around the efficient use of the available space within the aircraft. This reasoning will usually not apply on the longest routes since the consumption of fuel will then become a problem.

A great deal of effort has been expended to identify and optimize the overall performance of the aircraft. This includes work on increased engine performance, wing efficiency, laminar flow and other items which dictate the basic performance variables of the aircraft, such as cost per mile.

On the other hand, the efficient use of the interior capacity of the aircraft has, for the most part, been overlooked by airframe designers. It is believed that the maximum lift capacity of the aircraft is rarely utilized because of this inefficient use of the interior capacity of the aircraft.

On wide-body aircraft there is typically a main deck. The main deck may be used for carrying passengers or cargo with the space below the main deck used exclusively for carrying cargo. At various times the aircraft may fly only passengers and their baggage, only cargo, or a combination of passengers and cargo. In any case, the configuration of wide-body aircraft is such that only cargo is carried below the main deck, due at least in part to the fact that there is insufficient headroom between the main deck and the bottom of the aircraft to accommodate passengers.

It is well known that there is a plenum or airspace above the ceiling of the passenger compartment. This plenum is typically used for auxiliary equipment, control cables, wiring, plumbing and the like. There is, however, excess capacity in the plenum such that this volume of the interior of the aircraft is sorely under utilized. This is most clearly the case with the Boeing 747 but, to a somewhat lesser degree, is also the case with the other wide-body aircraft such as the McDonnell-Douglas DC10, the Airbus A300 and the Lockheed L1011. The Boeing 747, for example, has about 12 feet of space above the main deck, only about 8 feet of which is necessary for the main deck headroom and the plenum. The remainder is wasted space.

The under utilization of the interior of the aircraft and the plenum has been, at least partially, recognized in Greiss U.S. Pat. No. 4,055,317, the disclosure of which is incorporated by reference herein, wherein an aft galley is configured so as to protrude into the plenum. That is, the floor of the galley is raised above the main passenger deck so that the ceiling of the galley extends well into the plenum. There is now room between the main deck and the raised galley floor for the storage of food and other items. In this patent, there is no suggestion that the passenger compartment itself could be altered to improve the utilization of space.

Australian Patent No. 164626, the disclosure of which is incorporated by reference herein, illustrates a double-decked configuration in a portion of an aircraft which is suitable for carrying two levels of passengers or cargo. It is to be noted that in the passenger configuration the seats must be staggered so as to provide adequate passenger headroom.

It must be appreciated by now that an object of the invention is to provide a wide-body aircraft which is suitable for increasing passenger and cargo revenues.

It is another object of the invention to provide a wide-body aircraft configuration in which there is greatly improved utilization of the interior space of the aircraft.

It is yet another object of the invention to provide a wide-body aircraft configuration providing increased passenger seating space and increased cargo carrying space without unduly increasing the exterior dimensions of the aircraft.

These and other objects of the invention will become more apparent after referring to the following description of the invention in conjunction with the accompanying drawings.

BRIEF SUMMARY OF THE INVENTION

One aspect of the invention relates to a widebody aircraft having a fuselage, a main deck extending substantially the entire length of the fuselage and a lower deck, each of the decks being vertically spaced apart such that each of the decks is equally suitable for carrying passengers or cargo.

Another aspect of the invention relates to a widebody aircraft having a fuselage, a main deck extending substantially the entire length of the fuselage and a lower deck, each of the decks being equally suitable for carrying passengers or cargo, wherein the main deck is above the center line of the fuselage.

A final aspect of the invention relates to a method of improving the utilization of space in a widebody aircraft comprising the steps of: (a) providing a fuselage having a main deck extending substantially the entire length of the fuselage and a lower deck; and (b) spacing each of the decks apart such that each of the decks is equally suitable for carrying passengers or cargo.

DETAILED DESCRIPTION OF THE INVENTION

Figure 1:
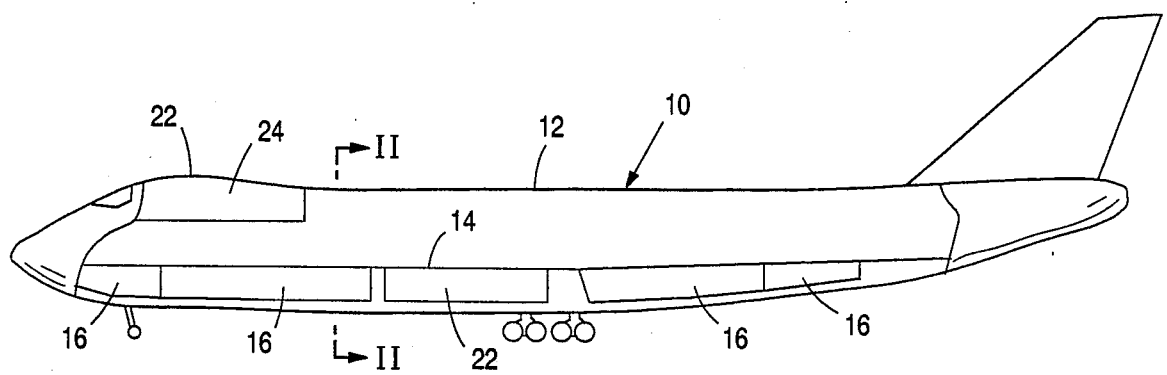
FIG. 1 is a schematic elevation view, in partial breakaway, of a prior art wide-body aircraft.

Referring to the figures in more detail, and particularly referring to FIG. 1, there is shown generally at 10 a prior art wide-body aircraft. The aircraft has a fuselage 12 and a main deck 14 which is a structural member. Area 16 below the main deck 14 is usually reserved for the storage of baggage. In the prior art aircraft 10, the main deck 14 may carry passengers or cargo, while the area 16 below the main deck 14 is used exclusively for carrying cargo and baggage. The reason for this will become clear after referring to FIG. 2.

Figure 2:
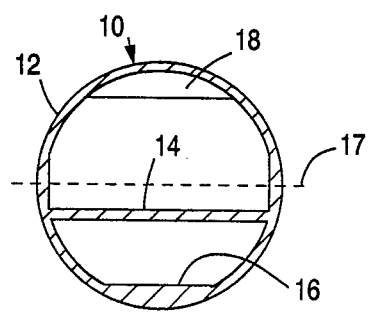
FIG. 2 is a schematic cross-sectional view of the wide-body aircraft in FIG. 1 in the direction of arrows II—II.

In FIG. 2 there is shown a cross-section of the prior art wide-body aircraft 10 of FIG. 1. As can be seen, the area 16 is much lower in height than the area above the main deck 14. The height of the lower area is, in fact, unacceptably low for carrying passengers. Area 16 must, therefore, be relegated to carrying cargo and passengers, baggage. Above main deck 14 is open space and plenum 18. The lower wall of the plenum is not intended to be a structural member. The plenum, as noted earlier, is used for various conduits. Even so, the inventor has found that there is a considerable amount of space in plenum 18 which is virtually unutilized. This unutilized space contributes to the grossly inefficient use of the interior space of the aircraft.

Structural support for the wings is provided by wing box 20. Details of the wing box are unimportant to the present invention other than its positioning which prevents the open area 16 below the main deck 14 from extending the full length of the aircraft 10.

Wide-body aircraft 10 may further comprise a bubble or lobe 22 at the forward end of the aircraft 10. The bubble or lobe 22 encompasses an upper deck 24 which may be utilized for additional passenger seating or for a lounge area. Such a bubble or lobe 22 is part of the Boeing 747 class of aircraft.

According to the present invention, there is disclosed a wide-body aircraft having a fuselage, a main deck and a lower deck, each deck extending substantially the entire length of the fuselage. Each of the decks is vertically spaced apart such that each of the decks is equally suitable for carrying passengers or cargo.

Figure 3:
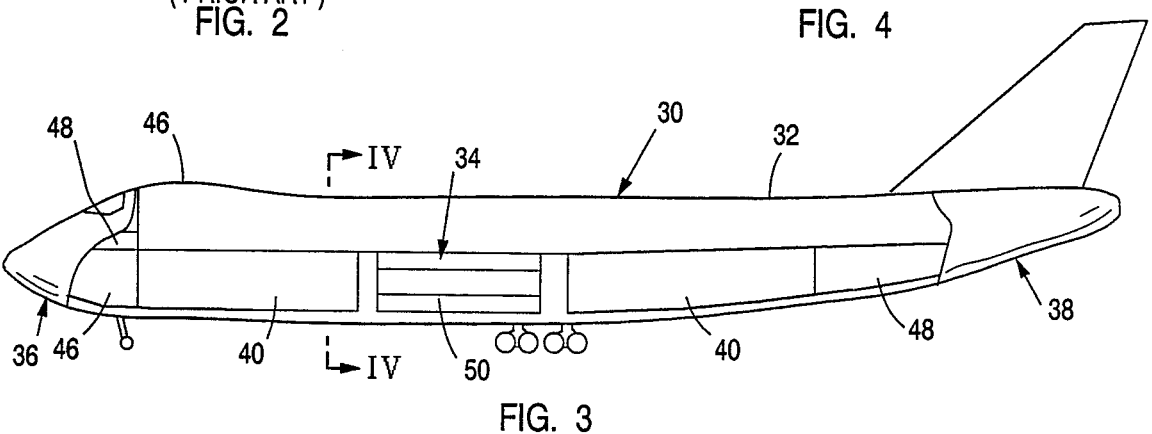
FIG. 3 is a schematic elevation view, in partial breakaway, of a wide-body aircraft according to the invention.

Referring now to FIG. 3, there is shown generally at 30 a wide-body aircraft according to the present invention having a fuselage 32. The aircraft 30 further has a main deck 34 extending substantially the entire length of the fuselage 32. The main deck 34 is a structural member. The only parts of the aircraft where the main deck 34 does not extend are the nose 36 and the tail 38 of the aircraft 30. The aircraft 30 further comprises a lower deck 40. The lower deck 40 is also a structural member and preferably extends substantially the entire length of the aircraft. Areas 48 are provided for carrying baggage. Each of the decks 34 and 40 is vertically spaced apart such that each of the decks 34 and 40 is equally suitable for carrying passengers or cargo.

Further according to the present invention, there is disclosed a wide-body aircraft having a fuselage, a main deck extending substantially the entire length of the fuselage and a lower deck. Each of the decks is equally suitable for carrying passengers or cargo. According to this aspect of the invention, the main deck is above the center line 42 of the fuselage.

Referring again to FIG. 3, there is shown a wide-body aircraft 30 having a fuselage 32. The aircraft 30 further has a main deck 34 extending substantially the entire length of the fuselage 32. As discussed previously, the only parts of the aircraft where the main deck 34 does not reach are the nose 36 and the tail 38 of the aircraft 30. The aircraft 30 further comprises a lower deck 40 which also extends substantially the entire length of the fuselage 32. Areas 48 are provided for carrying baggage. Each of the decks 34 and 40 is equally suitable for carrying passengers or cargo. The main deck 34 is above the center line 42 (most clearly seen in FIG. 4) of the fuselage 32.

Figure 4:
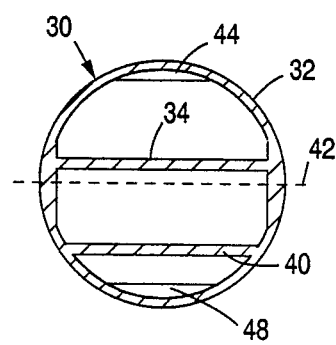
FIG. 4 is a schematic cross-sectional view of the wide-body aircraft in FIG. 3 in the direction of arrows IV—IV.

Referring now to FIG. 4, it can be seen that main deck 34 is spaced sufficiently from lower deck 40 such that their respective vertical heights (at least about 6.5 to 7 feet) are high enough whereby each of the decks 34 and 40 may accommodate passengers or cargo. Further, main deck 34 is above the center line 42 of the aircraft 30.

A comparison of FIGS. 2 and 4 makes the present invention most apparent. In FIG. 2, the area above the main deck 14 has much greater headroom than area 16 below the main deck. Main deck 14 is also below the center line 17 (about 3 feet below the center line on the Boeing 747) of the fuselage 12. In actuality, the headroom of the area 16 below the main deck is much lower than the 6.5 to 7 feet required to accommodate passengers. Therefore, lower area 16 is suitable only for the carrying of cargo and baggage. On the other hand, the area above the lower deck 40 in FIG. 4 has a vertical height at least equal to the 6.5 to 7 feet required for passengers and so is able to accommodate passengers if a passenger configuration is required. Alternatively, lower deck 40 may carry cargo and baggage or a combination of cargo, baggage and passengers. While the vertical height of the area above main deck 34 in FIG. 4 may be (but not necessarily) less than that of main deck 14 in FIG. 2, there is still sufficient height to accommodate passengers. The present invention is accomplished, at least in part, by reducing the size of the plenum 44 to a more space-efficient size. While the plenum 44 in FIG. 4 is smaller than plenum 18 in FIG. 2, there is nevertheless sufficient space in plenum 44 to carry the necessary conduits.

Stairways may be provided to link the various decks. Entrances and exits will remain through doors similar to those presently existing in wide-body aircraft.

The invention can be carried out without increasing the external size of the fuselage. The interior of the fuselage, however, will require redesigning so as to provide structural support for the raised main deck. It is well known that in the prior art wide-body aircraft, the main deck is actually a structural beam supported within the fuselage. Thus, moving the main deck requires substantial structural modifications (not shown) of the fuselage which are well within the capability of those skilled in the art of airframe design. It is thus expected that current wide-body aircraft could not be retrofitted with the present invention.

The present invention principally involves raising the main deck (about 3 or 4 feet) to take advantage of the wasted space in the plenum above the main deck. The lower deck is added to achieve a particular spacing between the decks and to comply with applicable safety regulations such as crash protection requirements.

The following are calculations and conclusions based upon the geometries illustrated in FIGS. 5 through 9 which are believed to show that the double-deck configuration of the subject invention offers improved structural performance in addition to increased passenger load capacity.

Figure 6:
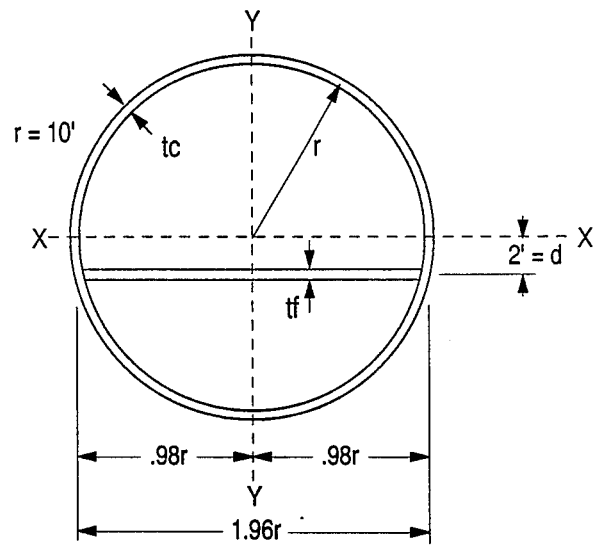
FIG. 6 is an enlarged view of section 1, shown in FIG. 5.
Figure 7:
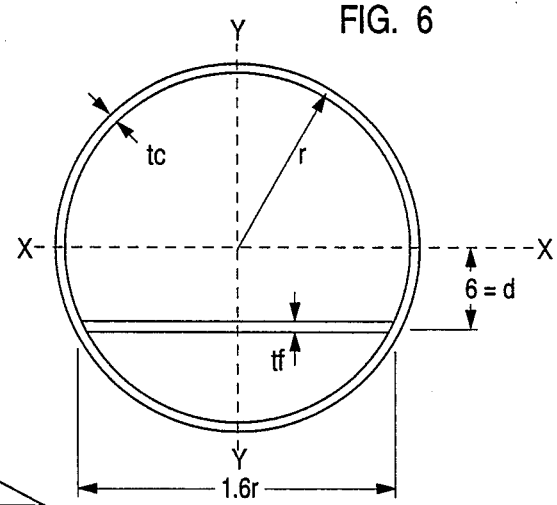
FIG. 7 is an enlarged view of section 2, shown in FIG. 5.
Figure 8:
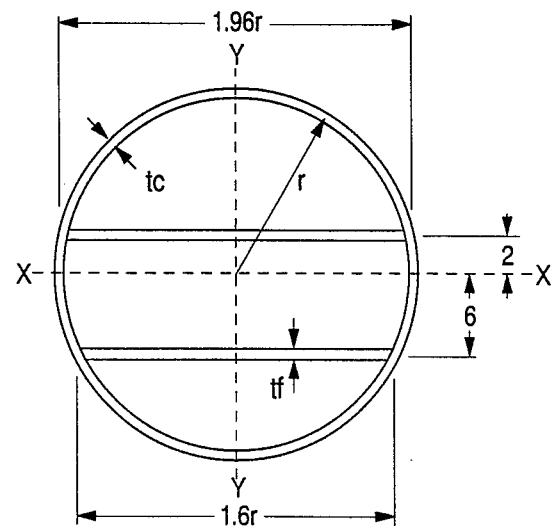
FIG. 8 is an enlarged view of section 3, shown in FIG. 5.

The following calculations will compare three different cylindrical cross-sections (FIG. 5) with Section (1) (as shown in FIG. 6) having a floor support 2 feet below or above the centerline x—x, Section (2) (as shown in FIG. 7) having a floor support 6 feet below the centerline x—x, and Section (3) (as shown in FIG. 8) having a super position of Section (1) & (2).

A calculation will be made for strength in bending and torsional rigidity for each section. The cylinder has been given a hypothetical radius of 10 feet. The purpose of this comparison is to show that a double deck aircraft offers improved structural performance to a single deck aircraft. To start, a calculation of section modulus using the center of each circle has been made for each section.

---

Calculation of Section Moduli for Section 1

Let: $d$ = Offset = 2
$r$ = Radius = 10
$tf$ = Floor thickness
$tc$ = Cylinder thickness
$I$ = I Shell + I Floor
$I_{xx} = \pi r^3 t_c + bh^3/12 + Ad^2$
$I_{xx} = \pi r^3 t_c + (1.96r)(tp)^3/12 + (1.96r)t_f(2)^2$
$(19.6(tf)^3)/12 << 3141tc$  Assume - $(19.6(tf)^3) = 0$ $\boxed{I_{xx} = (3141)tc + 19.6(tf)^3/12 + 19.6(tf)4}$ $I_{yy} = \pi r3tc + (bh^3)/12$ $\boxed{I_{yy} = \pi r^3 tc + (tf(1.96r)^3)/12}$ Calculation of Section Moduli for Section 2

$d$ = Offset = 6
$r$ = Radius = 10
$tf$ = Floor Thickness
$tc$ = Cylinder Thickness
$I$ = I shell + I floor
$I_{xx} = \pi tcr^3 + (bh^3)/12 + Ad^2$ $\boxed{I_{xx} = \pi tcr^3 + (1.6r)(tf)^3/12 + (1.6r)tf(6)^2}$ $I_{yy} = \pi tcr^3 (bh^3)/12$ $\boxed{I_{yy} = \pi r^3 tc + (tf(1.6r)^3/12}$ Calculation of Section Moduli for Section 3

Figure 9:
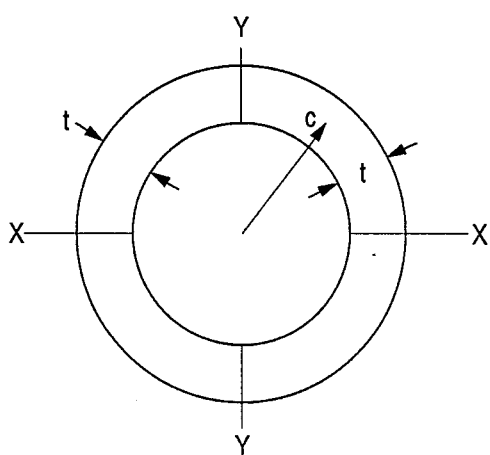
FIG. 9 is a cross-section of a thin cylinder used in calculating the polar moment of inertia related to the torsional rigidity of the subject invention.

---continued $d_1$ = Upper Offset = 6
$d_2$ = Lower Offset = 2
$tf$ = Floor Thickness
$tc$ = Cylinder Thickness
$I$ = I shell + I floor, + I floor 2
$I_{xx} = \pi tcr^3 + (bh^3)/12 + Ad_1^2 + bh^3/12 + Ad_2^2$
$I_{xx} = \pi tcr^3 + (1.96r(tf)^3)/12 + tf(1.96r)(2)^2 + 1.6r(tf)^3/12$
Assume $(tf)^3 = 0$ Because it is very small + $1.6r(tf)(6)^2$ $\boxed{I_{xx} = \pi tcr^3 + 19.6(tf)(4) + 16(36)tf}$ $\boxed{I_{yy} = \pi tcr^3 + (tf(1.96r)^3)/12 + (tf(1.6r)^3)/12}$ Torsional Rigidity
Calculations for Polar Movement of Inertia
of a Thin Cylinder Shown in FIG. 9

For thin tube $J = 2C^3T$
$J = I_x = I_y$
Call polar moment of inertia
(1) $J_1 = I_{xx} + I_{yy}$  $(tf)^3$ = very small 0

$\boxed{J_1 = 3141(tc) + 19.6(tf)/12 + 19.6(tf)4}$ $\boxed{+ 3141(tc) + (tf(19.6)^3)/12}$ $\boxed{(2) \; J_2 = \pi tc(r)^3 + 1.6r(tf)^3/12 + (1.6r)tf(6)^2}$ $\boxed{+ \pi tc(r)^3 + (tf(1.6r)^3/12}$ $\boxed{(3) \; J_3 = \pi tc(r)^3 + 19.6(tf)^3/12 + 19.6(tf)^4 + 16/4(tf)^3 + 16(36)tf}$ $\boxed{+ \pi tc(r)^3 + (tf(19.6)^3)/12 + (tf(16)^3)/12}$ Conclusions Based Upon the Following Assumptions
Strength in Bending

*About the X-X Axis.
If tc = tf Then
Section (1) $I_{xx}$ j = 3141tc + 100tf
Section (2) $I_{xx}$ = 3241(tc)
Section (3) $I_{xx}$ = 3141(tc) + 100(tf) + 576(tf)
$I_{xx}$ = 3817(tc)
$(3817 - 3241/3241) \times 100 = 17.7\%$ increase When tc is set equal to tf the section moduli is 17.7% greater; this means that the flexure properties and moment of inertia are 17.7% greater.

If $tf = 2tc$ or $tf = 10_{tc}$ The section moduli will increase to a greater number.

---

Summary of Conclusions Based Upon Assumption "tf = tc"

$tf$ = floor thickness
$tc$ = cylinder thickness
$J_1 = 2(3141)tc + (100)tf + (627)tf$
$J_1 = 7009(tf)$ if tf = tc
$J_2 = 6282(tc) + 572(tf) + 341(tf)$
$J_2 = 7195(tf)$ if tf = tc
$J_3 = 6282(tc) + 100(tf) + 627\, tf + 341(tf)$
$J_3 = 7922(tf)$ if tf = tc Conclusions If we assume tf=tc then the torsional rigidity of the double deck is a minimum of 13% greater, although a more likely assumption would set the deck thickness or (floor) thickness greater than the shell. This would greatly increase the torsional rigidity, as shown below.

--- i.e. (tf = 2(tc) or tf = 10(tc))
If tf = 10(tc)
J₁6282tc + +100(10tc) +627(10tc) + 572(10tc) + 341(10tc)22682
Delta = 100x 1352 − 22682/13552 = 67%
(1) at tc = tf the increase in torsional rigidity using the polar moment of inertia is approx. 13%.
(2) At tf = 10tc the increase is much greater, more like 67%.

---

Natural Frequency

It is very likely that the effects of natural frequency are also improved.

Due to the fact that the main deck 34 has been raised, there is now insufficient room within bubble or lobe 46 for an upper deck, as was the case in the prior art wide-body aircraft shown in FIG. 1. Even with the omission of the upper deck, the present invention still provides an increase of about 20-30% usable space over the prior art aircraft.

Due to the presence of the wing box 50, the passenger or cargo space lower deck 40 will have a generally centrally located discontinuity. That is, the space above lower deck 40 will not extend from the nose 36 to the tail 38 of the fuselage 32.

Advantages of the present invention are many. It is believed that by raising the main deck, adding a lower deck and increasing the spacing between the main and lower decks, the rigidity and strength of the airframe can be increased, as discussed above, without incurring a significant weight penalty.

The additional space created by the present invention can be used to provide additional comfort for the passengers (larger seats, more legroom, etc.), increased passenger seating or increased cargo capacity. Either of these will lead to increased revenue for the airlines and thus greater profitability.

A further advantage is that the present invention can provide the airline industry with an alternative to building an entire new airframe. The wide-body aircraft according to the invention can take advantage of the known reliability, operating economics and investment of the presently existing wide-body aircraft.

Overall, the usable space on a wide-body aircraft can be increased without increasing the size of the fuselage. It is estimated that for the Boeing 747 class of aircraft, usable space can be increased by about 20-30%. This number will be somewhat lower for the other types of wide-body aircraft, but it will still be significant.

Also, the versatility of the aircraft is dramatically increased. That is, the use to which the aircraft is put can be tailored to the prevailing requirements. If a heavy cargo load is required, both decks may carry cargo. Alternatively, if a heavy passenger load is indicated, both decks may carry passengers. Each deck may carry passengers or cargo or a combination thereof, to suit the needs of the aircraft owner.

Figure 10:
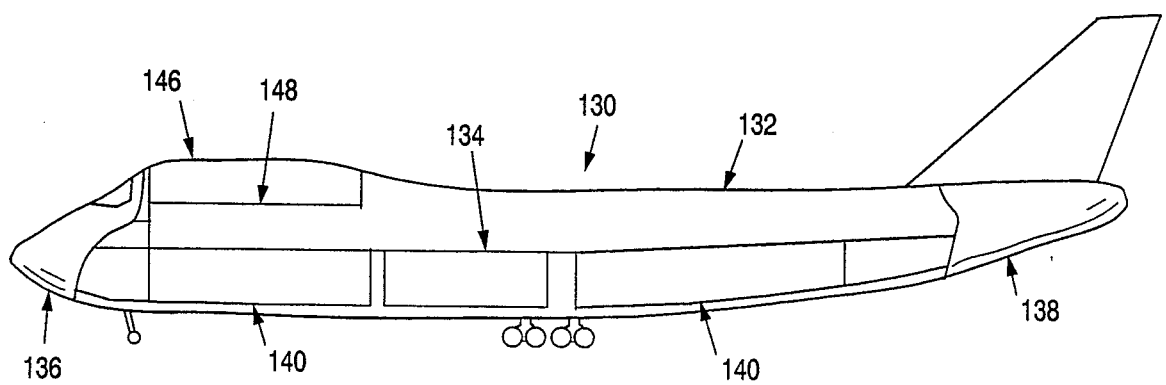
FIG. 10 is a schematic elevation view, in partial breakaway, of another embodiment of a wide-body aircraft according to the invention.
Figure 5:
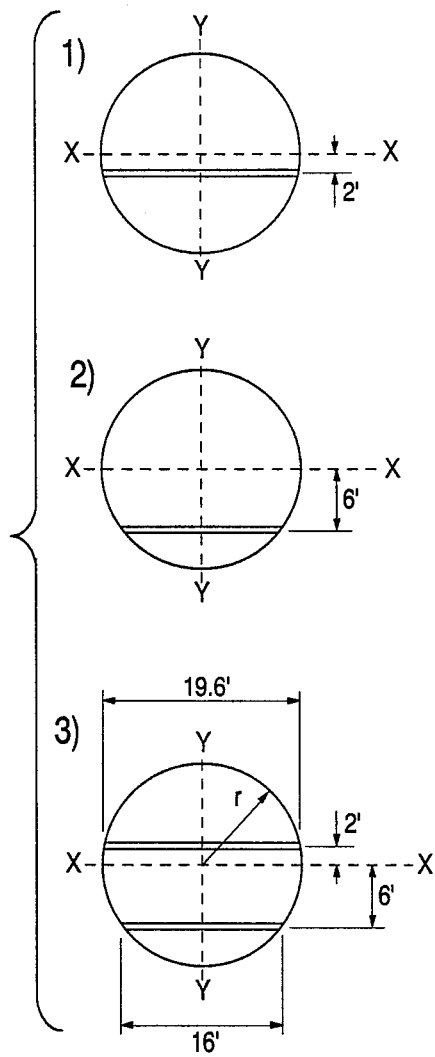
FIG. 5 is a diagrammatic cross-sectional view of three floor geometries used in calculations demonstrating the enhanced performance of the subject invention.

Referring now to FIG. 10, there is shown a further embodiment of the wide-body aircraft according to the invention. In many aspects, the wide-body aircraft 130 in FIG. 10 will be similar to the widebody aircraft 30 in FIG. 3. That is, the wide-body aircraft 130 will have a fuselage 132, a main deck 134 and a lower deck 140, each deck extending substantially the entire length of the fuselage 132, except for nose 136 and tail 138. Each of the decks 134 and 140 is vertically spaced apart such that each of the decks 134 and 140 is equally suitable for carrying passengers or cargo. Further, the main deck 134 may be above the center line (as shown in FIG. 4) of the fuselage 132.

In this embodiment, however, the bubble or lobe 146 at the forward end of the fuselage 132 is raised to allow for upper deck 148. The upper deck 148 is vertically adjacent the main deck 134 and, as shown, extends only the length of the bubble or lobe 146. Upper deck 148 may be used for carrying passengers or for a lounge, as desired.

Again, in this embodiment, each of the decks may be chosen to carry passengers or cargo or both, as the aircraft owner wishes.

It should be noted that in the embodiment just described the decks 134 and 140 extend from the nose 136 to the tail 13 of the fuselage 132.

If desired, the main deck 134 may be shortened slightly so that it does not extend under the upper deck 148. In this case, the upper deck 148 (and hence also bubble or lobe 146) may be lowered, but not to the same level as the main deck 134. The upper deck 148 will essentially be a mezzanine deck compared to main deck 134. Such an arrangement may then be utilized within the existing fuselage. While such an embodiment is not shown, it is nevertheless contemplated to be within the scope of the invention.

There is, according to the invention, a final aspect of the invention. This aspect of the invention relates to a method of improving the utilization of space in a wide-body aircraft. The method comprises the steps of providing a fuselage having a main deck extending substantially the entire length of the fuselage and a lower deck, and then spacing each of the decks apart such that each of the decks is equally suitable for carrying passengers or cargo.

As in the other embodiments of the invention, each of the main and lower decks may carry cargo or passengers or both.

It will be apparent to those skilled in the art having regard to this disclosure that other modifications of this invention beyond those embodiments specifically described here may be made without departing from the spirit of the invention. Accordingly, such modifications are considered to be within the scope of the invention as limited solely by the appended claims.

I claim:

1. A wide-body aircraft having a fuselage, a main deck extending substantially the entire length of the fuselage and a lower deck, each of the decks being vertically spaced apart such that each of the decks is equally suitable for carrying passengers or cargo, the main deck and the lower deck structurally interconnected to the fuselage, each deck providing substantially equivalent support to the fuselage, said fuselage having a cross-section the circumference of which is a single continuous convex curve, the combination of the main deck and the lower deck increasing the rigidity and strength of the fuselage while increasing the usable space within the aircraft without significant weight penalty.

2. The wide-body aircraft of claim 1 wherein the area between the main deck and the lower deck has a generally centrally located discontinuity along the length thereof.

3. The wide-body aircraft of claim 1 wherein the main deck and the lower deck are both structural members interconnected to said fuselage.

4. The wide-body aircraft of claim 1 further including a bubble or lobe at the forward end of the fuselage and an upper deck situated vertically adjacent the main deck and extending only the length of the bubble or lobe.

5. A wide-body aircraft having a fuselage, a main deck extending substantially the entire length of the fuselage and a lower deck, each of the decks being equally suitable for carrying passengers or cargo, wherein the main deck is above the center line of the fuselage, the main deck and the lower deck structurally interconnected to the fuselage, each deck providing substantially equivalent support to the fuselage, said fuselage having a cross-section the circumference of which is a single continuous convex curve, the combination of the main deck and the lower deck increasing the rigidity and strength of the fuselage while increasing the usable space within the aircraft without significant weight penalty.

6. The wide-body aircraft of claim 5 wherein the area between the main deck and the lower deck has a generally centrally located discontinuity along the length thereof.

7. The wide-body aircraft of claim 5 wherein the main deck is a passenger deck.

8. The wide-body aircraft of claim 5 wherein the main deck is a cargo deck.

9. The wide-body aircraft of claim 5 wherein the main deck carries a combination of cargo and passengers.

10. The wide-body aircraft of claim 5 wherein the lower deck is a passenger deck.

11. The wide-body aircraft of claim 5 wherein the lower deck is a cargo deck.

12. The wide-body aircraft of claim 5 wherein the lower deck carries a combination of cargo and passengers.

13. The wide-body aircraft of claim 5 further including a bubble or lobe at the forward end of the fuselage and an upper deck situated vertically adjacent the main deck and extending only the length of the bubble or lobe.

14. A method of improving the utilization of space in a wide-body aircraft comprising the steps of:
  (a) providing a fuselage having a cross-section the circumference of which is a single continuous convex curve;
  (b) providing a main deck and a lower deck structurally interconnected within the fuselage, each deck extending substantially the entire length of the fuselage, the main deck and the lower deck increasing the rigidity and strength of the fuselage and simultaneously increasing usable space within the aircraft without significant weight penalty, each deck providing substantially equivalent structural support to the fuselage; and
  (c) spacing each of the decks apart such that each of the decks is equally suitable for carrying passengers or cargo.

15. The method of claim 14 further comprising the step of providing a bubble or lobe at the forward end of the fuselage and an upper deck situated vertically adjacent the main deck and extending only the length of the bubble or lobe.

16. The method of claim 14 wherein the main deck is a passenger deck.

17. The method of claim 14 wherein the main deck is a cargo deck.

18. The method of claim 14 wherein the main deck carries a combination of cargo and passengers.

19. The method of claim 14 wherein the lower deck is a passenger deck.

20. The method of claim 14 wherein the lower deck is a cargo deck.

21. The method of claim 14 wherein the lower deck carries a combination of cargo and passengers.

* * * * *

UNITED STATES PATENT AND TRADEMARK OFFICE
CERTIFICATE OF CORRECTION

PATENT NO. : 4,925,132
DATED : May 15, 1990
INVENTOR(S) : Robert B. Zider

It is certified that error appears in the above-identified patent and that said Letters Patent is hereby corrected as shown below:

Column 2, line 42, delete "widebody" and insert therefor -- wide-body--.

Column 2, line 56, delete "widebody" and insert therefor -- wide-body --.

Column 3, line 41, delete "passengers," and insert therefor --passengers'--.

Column 5, line 64, delete "$\pi tcr^3(bh^3)/12$" and insert therefor -- $\pi tcr^3 + (bh^3)/12$ --.

Column 5, line 66, delete "$(tf(1.6r)^3/12$" and insert therefor -- $(tf(1.6r)^3)/12$ --.

Column 6, line 28, delete "$(tf(1.6r)^3/12$" and insert therefor -- $(tf(1.6r)^3)/12$ --.

Column 7, line 7, delete "100x 1352" and insert therefor -- 100x 13552 --.

Column 8, line 16, delete "13" and insert therefor --138--.

Signed and Sealed this

Twenty-eighth Day of May, 1991

Attest:

HARRY F. MANBECK, JR.

Attesting Officer    Commissioner of Patents and Trademarks